Dec. 28, 1954    J. F. JOY    2,697,911
PULSATING APPARATUS AND SHAKER
DRIVES INCORPORATING THE SAME

Filed March 24, 1948            6 Sheets-Sheet 1

Inventor:
Joseph F. Joy.
by Louis A. Maxom
atty.

Inventor:
Joseph F. Joy.
by Louis A. Maxson
Atty.

Dec. 28, 1954

J. F. JOY 2,697,911

PULSATING APPARATUS AND SHAKER
DRIVES INCORPORATING THE SAME

Filed March 24, 1948

Inventor:
Joseph F. Joy.

Dec. 28, 1954

J. F. JOY
PULSATING APPARATUS AND SHAKER
DRIVES INCORPORATING THE SAME 2,697,911

Filed March 24, 1948

Inventor:
Joseph F. Joy.
by Louis A. Maxon
atty.

United States Patent Office 2,697,911
Patented Dec. 28, 1954

2,697,911

PULSATING APPARATUS AND SHAKER DRIVES INCORPORATING THE SAME

Joseph F. Joy, Pittsburgh, Pa., assignor to Joy Manufacturing Company, Pittsburgh, Pa., a corporation of Pennsylvania Application March 24, 1948, Serial No. 16,774

The terminal portion of the term of the patent to be granted which extends beyond 17 years from February 23, 1954, has been disclaimed 10 Claims. (Cl. 60—52)

My invention relates to pulsating devices, and from another aspect to pulsating apparatus of which such pulsating devices constitute the actuating means.

Many devices, such as shaker screens, shaker conveyors, etc., employ motions in which there occur in alternation a relatively slow and uniform movement in one direction and a relatively sharply accelerated motion in the opposite direction. During the motion in the first direction material supported on a plate, screen, pan or the like moves with the element on which it is supported, but during the other sharper movement of each cycle the supporting surface moves beneath the material which it supports, with the result that there is a progressive advance of the material in the direction of the slower movements, as well as an agitation of the material as it is bodily moved. Various mechanisms using cams, springs and other mechanical elements have been provided for the generation of such motions, but these devices are frequently cumbersome and occupy an undesirable amount of space, whereas an apparatus of the type of my invention is simple, provides a very desirable motion, is free from substantial mechanical difficulties, and is very rugged.

An object of my invention is to provide an improved pulsating device. Another object of my invention is to provide an improved pulsating apparatus. Another object of my invention is to provide an improved pulsating apparatus utilizing a liquid to build up and release energy in an energy storing device. Still another object of my invention is to provide an improved pulsating apparatus utilizing a gas and a liquid to secure the pulsating movement. A further object of my invention is to provide improved devices utilizing pulsating motions, of which devices the pulsation producing apparatus is very simple, compact and effective. A still further object of my invention is to provide an improved pulsating mechanism in which a hydraulic fluid is displaced to increase the pressure of an entrapped volume of gaseous fluid and then suddenly allowed to return to the point from which its displacement started. Another object of my invention is to provide an improved pulsating apparatus in which a hydraulic fluid is displaced by a pump to store up energy in an energy storing device, and then suddenly released, thereby to provide alternate relatively slow and uniform and relatively sharply accelerated impulses. Still another object of my invention is to provide an improved pulsating apparatus in which a liquid is displaced from a space under a relatively low pressure but yet a pressure sufficient for cushioning, and used to build up a higher pressure as it displaces an element to which motion is to be transmitted, and then released to return quickly to the space under lower pressure, to provide a rapid return movement of the element. Still another object of my invention is to provide an improved pulsating apparatus including a liquid displacement means for moving an element in one direction and further including periodically opened release passage means for allowing the return of the liquid and the return movement of the element displaced. Still a further object of the invention is to provide an improved pulsating apparatus employing fluid displacing means including cooperating elements during a portion of the relative movement of which a pressure is built up and in a predetermined relative position of which the stored up pressure is sharply released. Still another object of my invention is to provide an improved pulsating apparatus including at least one unidirectionally rotating element whose movement in such direction is attended by the intermittent delivery in one direction of successive masses of fluid, and the intervening release in the other direction of such masses, the displaced fluid acting as it is delivered to effect movement in one direction of an element to be moved, and upon its release freeing said element for reverse movement. A still further object of my invention is to provide an improved pulsating apparatus including unidirectionally rotating elements during a portion of the relative rotation of which an element to be controlled is moved in one direction and a pressure is built up, and during a further portion of the movement of which the liquid displaced is allowed to vent and the stored energy acts upon the element to effect its return movement. Other objects and advantages of my invention will hereinafter more fully appear.

In the accompanying drawings, in which, for purposes of illustration, there are shown certain embodiments of my improved pulsating device and certain forms of apparatus in which said pulsating device in one or another form thereof is incorporated as the source of power.

Figure 5:
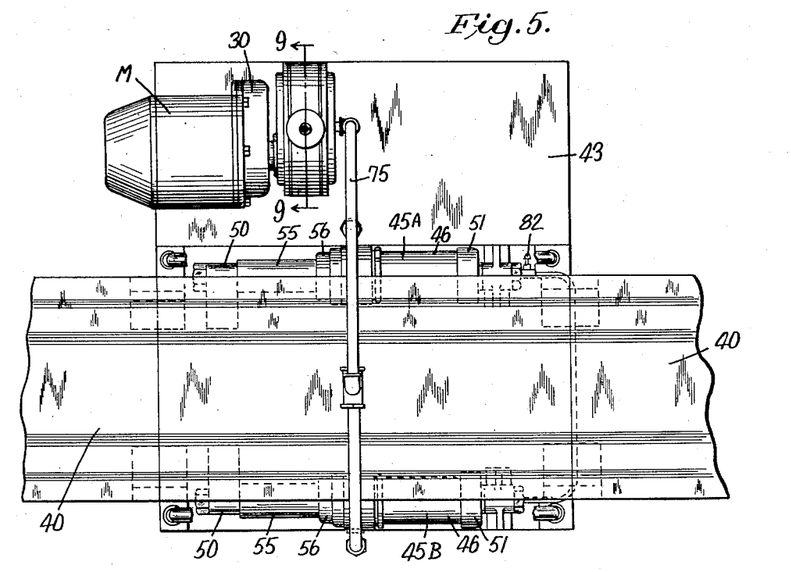
Fig. 5 is a plan view of a portion of a shaker conveyor constructed according to my invention from one of its aspects.
Figure 6:
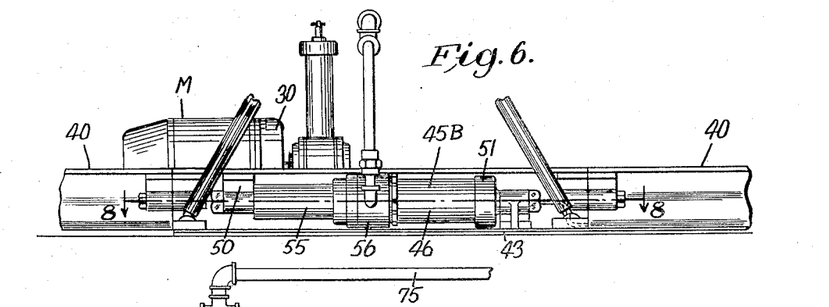
Fig. 6 is a side elevation of the structure of Fig. 5.
Figure 7:
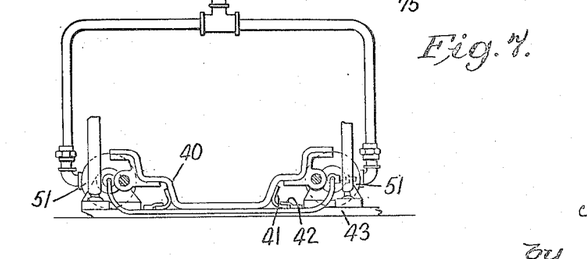
Fig. 7 is an end view of the shaker conveyor drive mechanism of Figs. 5 and 6.

Referring to the drawings, and first to Figs. 1 to 4, it will be observed that in these figures I have shown an arrangement for producing alternate relatively slow and relatively fast movements of a liquid, each movement under an appropriate pressure, for effecting a desired movement of a movable element of an associated device. It will be understood, as will be more clearly apparent when applications of the structure of Figs. 1 to 4 are later explained, that this apparatus will be used with a movable element whose movement is effected by the positive displacement of fluid by the apparatus illustrated, and which movement is attended by the storing up of energy for accomplishing a return stroke upon release of the liquid which has been occasioning the movement. With this understanding, the structure illustrated in Figs. 1 to 4 may be readily followed. A rotor casing 1 having overlapping intercommunicating rotor chambers 2 and 3 is provided with end plates 4 and 5 by means of which, in suitable bearings 6, there are rotatably supported a pair of rotors 7 and 8. The rotor 8 has stub shafts 9 in the illustrative embodiment formed integrally with it and journaled in the bearings 6. The rotor 7 has a stub shaft 10 journaled in one of the bearings 6 and a projecting drive shaft 11 extending through and journaled in the other bearing. An appropriate seal 12 is provided for preventing leakage of fluid along the shaft 11. In the illustrative embodiment now being described, each of the rotors 7 and 8 is a toothed rotor, and their structures are generally similar. Each is provided with a number of tooth pockets 14 formed between adjacent teeth, and each is provided with a slot notch, passage or bypass opening 15 extending chordally and of such size and depth as in cooperation with the corresponding slot on the other rotor to permit the very quick reverse flow of fluid which has been forced in one direction by the co-operation of the teeth and tooth pockets of the rotors. The rotor chamber is provided at opposite sides thereof (at opposite sides of the mesh line of the rotor teeth) respectively with a passage 16 leading to an element whose motion is to be effected and controlled, and a passage 17 opening into the bore 18 of a cylinder 19, shown in this illustration as integral with the casing 1. Within the cylinder, which has a head 20 provided with packing devices 21 for preventing leakage of fluid either through the threaded connection 22 of the head with the cylinder 19 or along a piston rod 23 which extends through an opening 24 in the head, there is reciprocable a piston 25. The piston 25 comprises an element 26 with which the piston rod 23 is integral and an element 27, and between the elements 26 and 27 there is provided a suitable packing structure 28 for preventing leakage between the opposite sides thereof. The shaft 11 will be driven through any appropriate means, and in Fig. 5 a motor M is shown driving through an appropriate reduction gearing, not shown but enclosed in a housing 30, the pulsating device including the rotors 7 and 8. When the piston 25 is moved to the right in the bore 18 (referring to Fig. 3), the space to the left of the piston 25 is adapted to constitute a reservoir for liquid, such as light oil, while the space 31 to the right of the piston is adapted to be maintained under pneumatic pressure during use of the device so that a positive feed of oil to the tooth pockets 14 will be effected. The liquid may be introduced through a conduit 32 formed in the piston rod 23; and a tapered sealing plug 33 is arranged in the end of the piston rod and is adapted to seal off a radial filler passage 34 which may be provided with a connection not shown for the introduction of liquid. Removal of the plug will obviously permit drainage.

Figure 3:
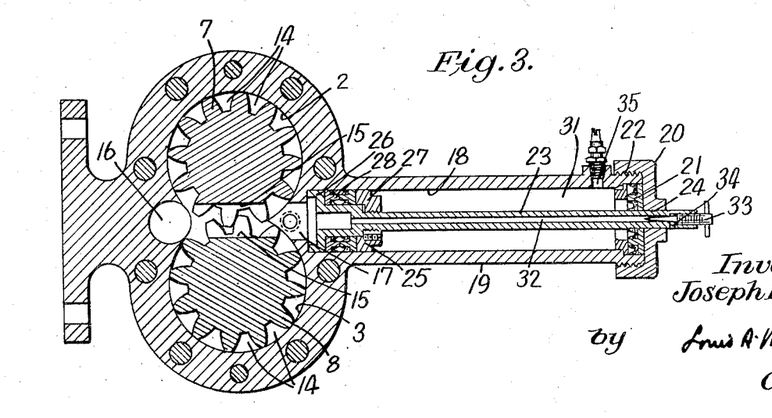
Fig. 3 is a section through the structure of Fig. 1 on the plane of the line 3—3 of Fig. 2.

Pressure may be built up in the space 31 by placing air sealed in said space under pressure by forcing the piston 25 to the right on the introduction of oil under pressure, but a more satisfactory arrangement, generally speaking, consists in introducing pressure through a valved lateral opening 35, thus insuring sufficient pressure to move the piston 25 all the way to the left in Fig. 3 while the pressure in the chamber 31 remains above atmospheric.

Figures 1, 2, 4:
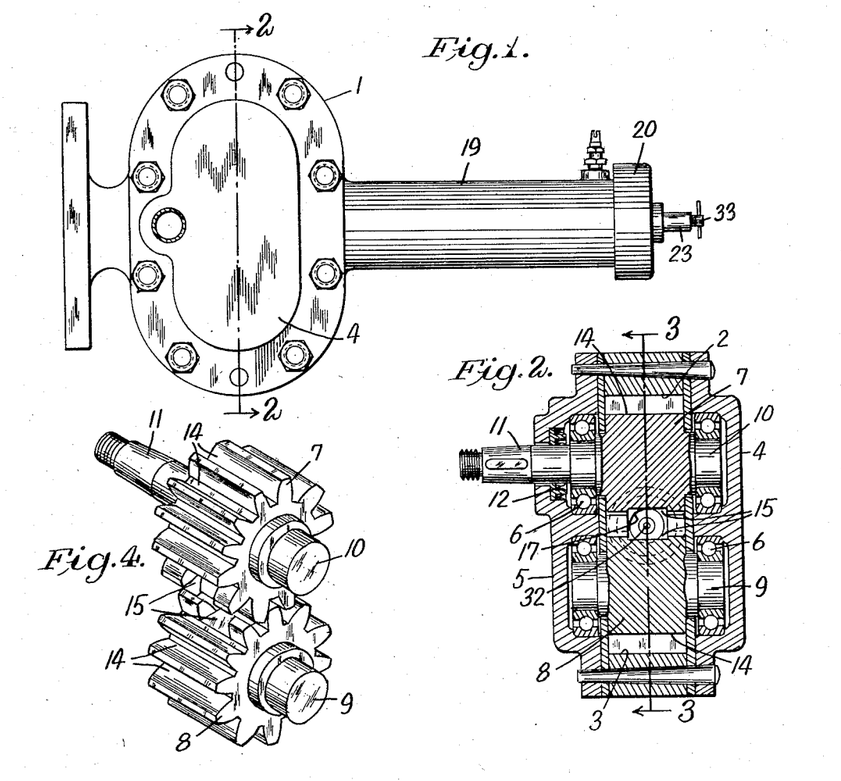
Fig. 1 is a side elevational view of one illustrative embodiment of a pulsating device.
Fig. 2 is a section on the plane of the line 2—2 of Fig. 1 through the rotor chamber of the pump-release mechanism which forms a part of said pulsating apparatus.
Fig. 4 is a perspective view of the rotors which are shown in section in Figs. 2 and 3.

Referring to Fig. 3 again briefly, it will be observed that if the piston 25 be regarded as being far to the right in the cylinder 19 and the rotors are turning, the top one counterclockwise and the bottom one clockwise, the tooth pockets will tend to deliver oil from the reservoir in the cylinder 19 and to the outlet connection 16 whenever the escape provision formed in the rotors is not functioning. This escape provision is formed in the illustrative embodiment disclosed by cutting the slots or notches 15, 15 along chordal lines and making these slots or notches somewhat deeper than the depth of the tooth pockets, as shown in Figs. 2 and 3, and also making them less wide than the tooth pockets, as shown in Figs. 2 and 4. By this arrangement, when the two slots or notches are in the mutually opposite position shown in Fig. 3, or in positions at a substantial angle to either side of this position, there will be a free opening from the connection 16 back to the interior of the cylinder 19 at the left of the piston 25. The rotors will, however, be in constant mesh with each other, and when each has been turned through the requisite angle and in the directions above mentioned from the position shown in Fig. 3, there will be delivered liquid to the outlet connection 16 and this flow will take place until the continued rotation of the rotors again opens up communication from the exhaust to the reservoir through the slots 15, 15.

Obviously the air under pressure within the space 31 will tend to move the piston in a direction to feed the fluid to the tooth spaces, but the pressure for returning the fluid from the delivery port 16 must come from structure with which this port communicates. This structure may, where the apparatus to which pulsations are supplied by the structure to far described is a shaker conveyor as shown in Figs. 5, 6, 7 and 8, consist of a pair of devices to which fluid may be admitted against a yielding pressure provided either by a spring or by a gaseous fluid under pressure, or by both, and the devices mentioned are operatively connected to the shaker trough so as to impart movement to the latter when fluid is supplied by the pulsating device. It will be observed that a shaker conveyor trough 40 is provided with guides 41 which cooperate with stationary guides 42 mounted on a base 43, and these guides guide the conveyor trough 40 for rectilinear reciprocation. In order that the conveyor trough may be provided with reciprocating forces in such a manner as not to effect cramping at the guides, two mechanisms designated respectively 45A and 45B are arranged at the opposite sides of the trough 40, and each of these includes a cylinder 46 secured as at 47 to the base 43, and a piston 48 secured as at 49 to a transverse member 50 which is secured to the conveyor trough 40. Each of the devices 45A and 45B includes a cylinder head 51 held by the supporting means 47 in fixed relation to the base, and the cylinder 46 is secured to the head 51, while the piston 48 is reciprocable in the bore 54 of the cylinder member 46 and has a piston rod 55 which is the element by which the piston 48 is connected as at 49 to the cross member 50. The cylinder member 46 carries a head 56 held as at 57 to the cylinder member and having a packing 58 which prevents leakage between the cylinder member and the head 56. The piston consists of a head 59 integral with the piston rod, and a head 60 threadedly connected at 61 to a rearward projection of the piston rod, and multiple packing seals 62 are arranged between the integral head 59 and the relatively adjustable head 60. The piston rod 55 may be hollow, as at 64, and by being so made, the increase in pressure provided by rightward movement of the piston will be diminished. The head 56 has an annular groove 66 formed in its inner surface. Into this annular groove there projects a radially perforated ring 67 received in part between the member 56 and an annular flange 68 on a ring 69 between which and a bushing 70 closely surrounding the piston rod 55 there is arranged a double seal 71. The ring 67 is internally grooved as at 73 to form an annular chamber, and a sealing ring 74 acting as a valve in association with the radially perforated ring 67 permits pressure to enter the annular groove 66 from fluid connections including a flexible but not yielding supply line 75 connected to the opening 16, but prevents its return through the radially ported ring, with a result that even if the integral piston 59 moves rather far to the left in Figs. 8 and 10, fluid can obtain access to the left hand face of the piston portion 59 and start the latter rearwardly, but when the piston is moving to the left in Fig. 10, a cushion is provided in the recess 73 and there is no possible chance for the liquid to flow through the perforations in the ring because the ring valve 74 will effect a seal. In order that the desired pressure may be built up in the space inside of the cylinder member 46, a mechanical spring 80 may be provided of any desired strength, and in addition a conduit 81 having a means 82 for the introduction of air under pressure to it may be provided for delivering pressure into the space inside the cylinder member 46 and sealing it therein when the desired pressure has been built up.

Figure 8:
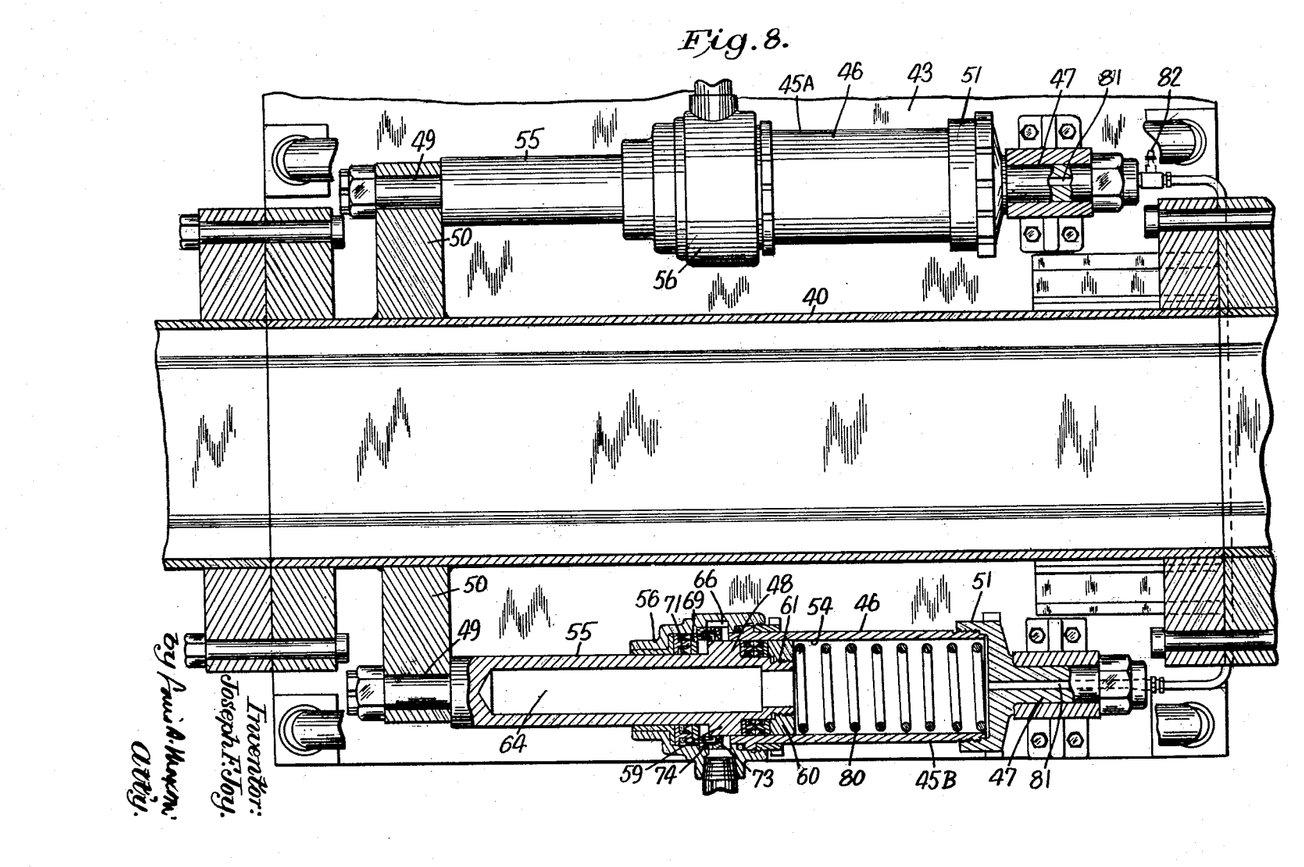
Fig. 8 is an enlarged horizontal sectional view on the plane of the line 8—8 of Fig. 6, with parts shown in full.
Figures 10, 11, 12:
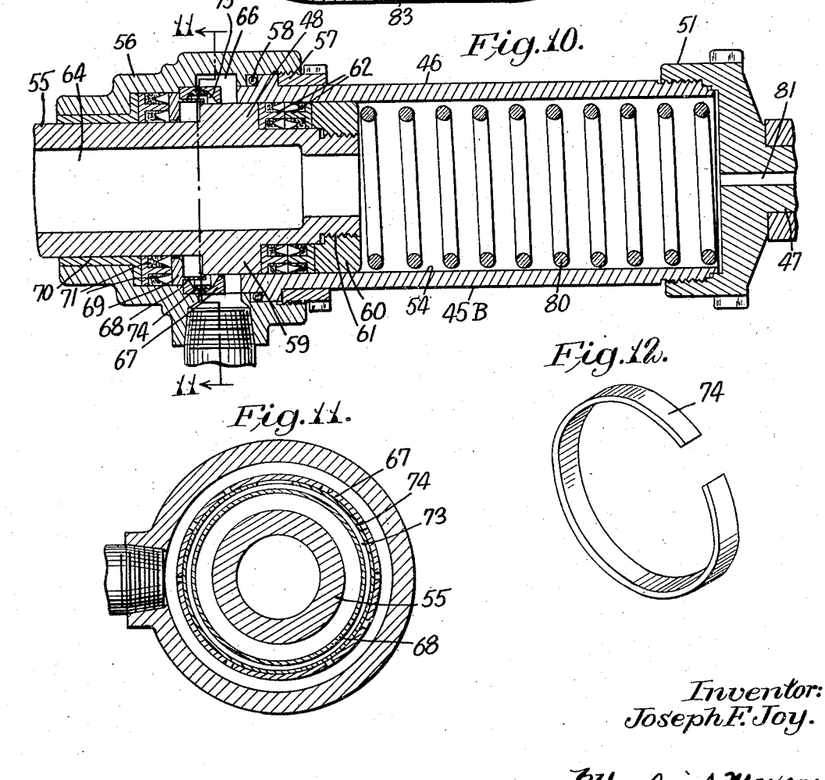
Fig. 10 is a somewhat enlarged horizontal section on the same plane as Fig. 8, showing only a portion of the structure of Fig. 8, but more clearly in view of the increased size.
Fig. 11 is a cross sectional view on the plane of the line 11—11 of Fig. 10.
Fig. 12 is a detail view showing a check valve.

It will be evident that the movements of the piston rod 55 will be transmitted to the shaker trough means, and it will shortly be apparent that the movements in one direction, toward the right in Figs. 8 and 10, will be effected by liquid admitted through the supply line 75 leading to the annular spaces 66, and that movement in the opposite direction of the piston rods, and accordingly of the shaker conveyor line, will be effected by the action of the mechanical springs 80 when one is used, with the cumulative effect of the air placed under higher pressure by the movement toward the right of the conveyor trough, which air is contained in the cylinder bores.

Let us now re-examine the structure which has been described. As an apparatus to be operated there has been described a shaker conveyor trough line suitably supported, and which, in the form shown, is but illustrative of any suitable means for longitudinal reciprocatory movement, the movement in one direction being a motion which will cause the movement of material, and the movement in the other direction being one which will, through its nature, be ineffective to effect a reverse movement of the material, but rather leave the material without reversal of movement while the trough is, as it were, jerked beneath it.

It will be appreciated that the volume of fluid in the system will consist of the volume which is contained in the conduits, the volume which is contained in the device 1 including the reservoir provided in the cylinder 19, and the volume of fluid which is contained in the cylinders 46 to the left of the piston heads 59.

The displacement of the tooth pockets 14 will be sufficient to force enough fluid into the spaces to the left of the piston heads 59 to provide for the desired movement in one direction—the loading direction—of the shaker mechanism. The quantity of fluid storable in the chamber 18 to the left of the piston 25 will be sufficient to supply the quantity which the tooth pockets can displace between the successive establishments of the return connection through the slots 15. The pressure per square inch exerted on the fluid to the left of the piston 25 will be less per square inch than will be exerted by the piston mechanisms 48 under the action of the air and mechanical springs. Accordingly, starting with the position of the pistons 48 as shown in Fig. 8 and with the piston 25 displaced to the right from the position shown in Fig. 3, the rotation of the rotors 7 and 8, force-fed with liquid by reason of the pressure acting in the chamber 31, will displace liquid to the left hand side of the pistons 48 and force these to the right in Fig. 8 at a substantially uniform speed until the through connection, illustrated in Fig. 3 in its full flow position, occurs, upon which event, since the pressure of the springs 80 and of the entrapped fluid under pressure in the cylinder bores 54 will exert a higher pressure in pounds per square inch on the liquid to the left of the piston heads 59 than the maximum pressure per square inch exerted on the liquid by the air in the cylinder 18, the fluid will be forced back through the bypass openings 15 and enter the bore 18 and force the piston 25 to the right, thus restoring the system to a condition ready for the next positive displacement of the liquid from the reservoir 18 into the shaker drive cylinders 46.

It will be observed that I have not illustrated the size of the pulsation producing device 1 with mathematical precision, as this is unnecessary for purposes of illustration. The physical proportions of the displacement device will of course take into consideration the volume of fluid which must be displaced in order to effect the requisite piston movement and to make some allowance for slippage of liquid relative to the rotors, and it is necessary, with the construction shown for purposes of illustration, to effect a sufficient movement of liquid in the tooth pockets in materially less than one revolution of each of the rotors to provide the quantity of liquid that is required to move the pistons 48 in the shaker drive. The number of pulsations will depend upon the number of R. P. M. with the construction which has been illustrated. There will be one complete pulsation—forward and backward movement—for each revolution of the pump rotors.

Figure 9:
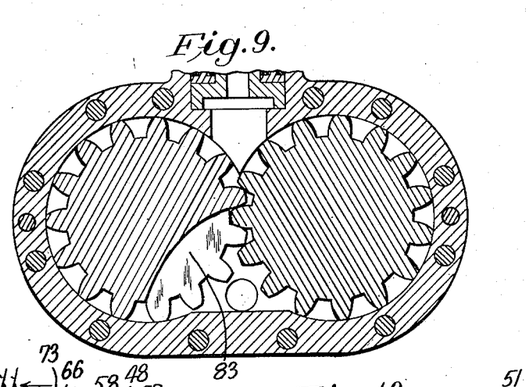
Fig. 9 is a vertical section through a modified pump-release structure, the section corresponding to one taken on the plane of the line 9—9 of Fig. 5, and being on an enlarged scale.

It is obviously unnecessary that chordal grooves be provided as shown in Fig. 3; and, as another possible construction, but by no means the only other possible one, there is shown in Fig. 9 an arcuate groove 83 formed in but one of the rotors. It is not only necessary that the displacement of the tooth pockets be sufficient to effect the positive displacement by the rotor teeth of the amount of fluid necessary to effect the desired movements of the pistons of the shaker drive, but also that the return connection through or past the rotors, however arranged, shall have a greater flow capacity than the displacement of the tooth pockets during the time that the return connection is open, the excess flow capacity being such as to permit, under the pressure exerted by the mechanical and air springs in the shaker drive device, return to the cylinder 19 of substantially all of the liquid previously forced into the shaker drive cylinders during the immediately preceding fluid pumping operation of the tooth pockets.

The mode of operation may be resummarized as follows: The piston 25 in the oil reservoir will be under pressure on its right hand side from entrapped air. Accordingly rotation of the rotors 7 and 8 will result in the movement of tooth pockets full of liquid. A corresponding volume of liquid will be positively displaced into the chambers 66 and force the hollow pistons 48 to the right in Figs. 8 and 10. This will require considerable force, which the motor will supply, because it will be necessary not only to supply the force to move the pan line but also the force to compress the springs 80 and to compress the air entrapped within the cylinders 45A and 45B and within the hollow piston rod chambers 64. When the rotors have turned far enough to commence to open the escape passage through one or both of them, there will be no longer a movement by the liquid of the pan line in the delivery direction after the escape passages have become equal in flow capacity to the displacement of the tooth pockets, and accordingly the springs 80 and the air under pressure which mutually supplement each other will force the pistons in the cylinders 45A and 45B back to the left and displace the fluid back through the return passages into the storage chamber within the cylinder 19. Once each revolution of the pump or pulsating device there will be a movement at relatively uniform velocity of the trough line to the right in Fig. 6, and once in each revolution there will be a return movement which will be of a different and a more sharply accelerated nature under the action of the springs and the air pressure. There will accordingly be a very effective action of the apparatus in imparting a true shaker or jigging motion to the conveyor.

Figure 13:
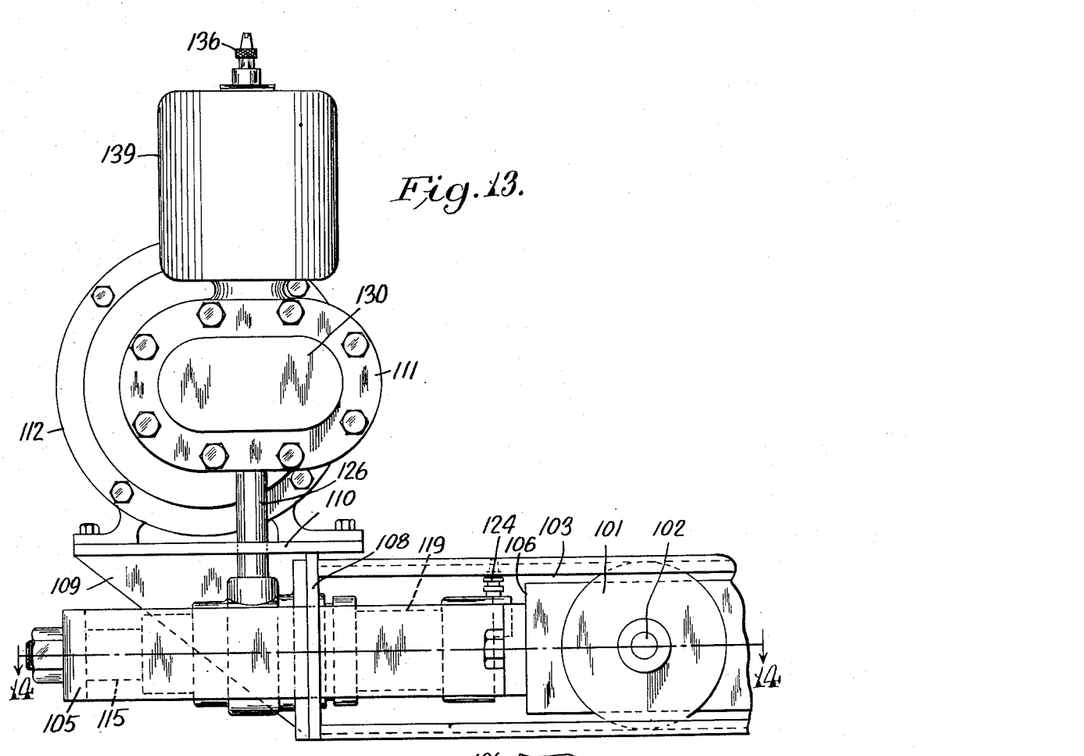
Fig. 13 is a side elevational view of a shaker screen device constructed in accordance with my invention.
Figure 14:
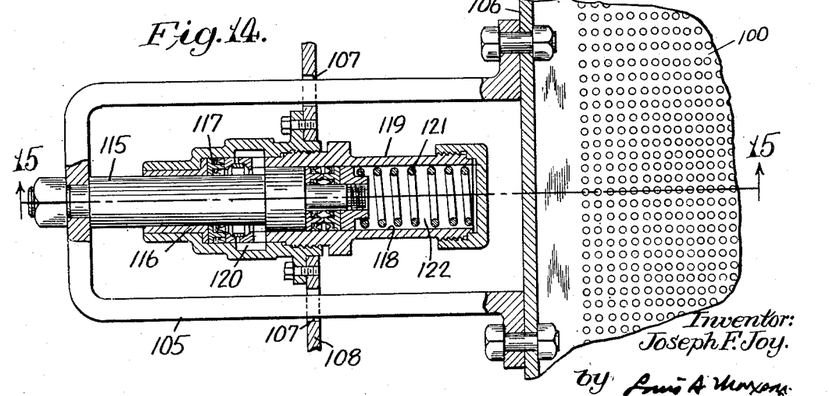
Fig. 14 is a horizontal section on the plane of the line 14—14 of Fig. 13.
Figures 15, 16:
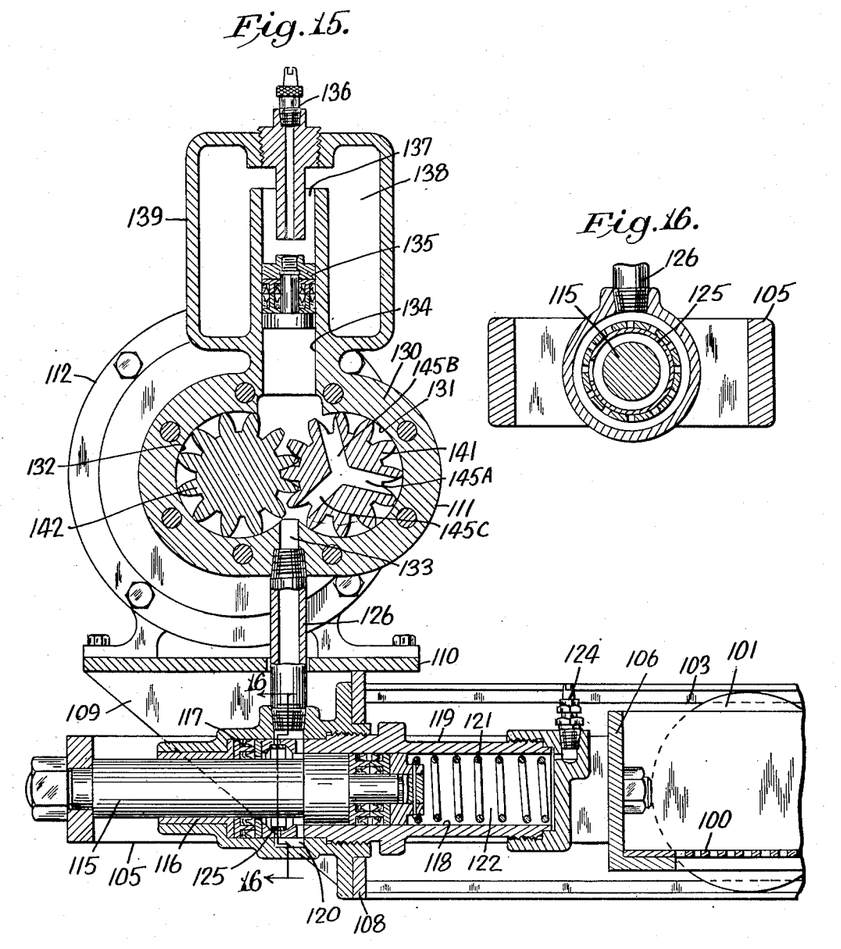
Fig. 15 is a vertical sectional view on a slightly enlarged scale through the device shown in Fig. 13, on a plane corresponding to the line 15—15 of Fig. 14.
Fig. 16 is a detail cross sectional view on the plane of the line 16—16 of Fig. 15.

It is not essential that the apparatus to be driven be a shaker conveyor, and as illustrative of another form of apparatus which may be actuated by devices of the character in question, I have shown in Figs. 13, 14 and 15 a screen 100 supported by suitable rollers 101 on appropriate axles 102 and moving in guides 103. The motion of a screen is ordinarily shorter, sharper, and with a much higher amplitude than is the case with a shaker conveyor, and I have illustrated my improved pulsating device in a form adapted to a high-frequency movement. The screen 100 has a yoke 105 secured to one of its ends 106. This yoke extends through openings 107 in a cross frame 108 which as shown supports, with the aid of bracket plates 109, a platform 110 on which the actuating device 111 and its driving motor 112 are supported. Separate mountings might of course be employed. The yoke 105 has secured to it a piston rod 115 which extends through an appropriate bushing 116 and packing 117 into the bore 118 of a cylinder essentially the same in construction as the cylinder mechanisms 45A and 45B. It is therefore unnecessary completely to redescribe the structure of this mechanism, but it may be noted that the bore 118 is formed in a cylinder 119 having its bore adjacent its forward end surrounded by an annular chamber 120 and having a spring 121 and air chamber 122 arranged similarly to the corresponding parts in the apparatus first described. An air or other gas filler plug 124 is provided, as shown in Fig. 15, and a valve 125 for providing the desired cushioning action is also present. A short connection 126 extends to the annular chamber 120 from the pulsating device 111 which includes a casing 130 having overlapping bores 131 and 132 in it and having a connection 133 with the connection 126, and having a cylinder 134 communicating with the intercommunicating bores opposite the connection 133. Within the cylinder there is reciprocable a suitably packed piston 135 and a connection 136 is provided for the admission of pressure into the upper end of the cylinder 134, which will be noted to communicate freely as at 137 with a considerably larger clearance volume 138. By the provision of this large clearance volume in a casing 139, a nearly uniform pressure may be exerted by the entrapped gas on the piston 135, since the movement of the latter in the intervals between its reversals of movement—between its downward movement forcing liquid into the tooth pockets of the rotors shortly to be described and its backward movement under the pressure produced by the spring 121 and the gas in the chamber 122—will not produce a sufficient change in the ratio of the two volumes to markedly affect the pressure in the bores 138, etc.

Rotors 141 and 142 are arranged in the chambers 131 and 132, and one may be imperforate and one provided with radially extending return channels 145A and 145B and 145C arranged at angles of 120° to each other. Obviously with three opportunities for the escape of fluid in each R. P. M., there will be three pulsations or complete vibratory movements of the screen 100 during each R. P. M. of the rotors 141 and 142. The driving motor 112 will be connected in any suitable manner, and through suitable reduction gearing, if there is occasion for its use, in driving relation with the rotors—herein a coaxial relation of the rotor 142 with the motor 112 being consistent with a direct drive of the rotor 142, if desired. This embodiment of the invention requires no detailed review in view of what has been said with respect to the first one. The primary differences are the increased number of cycles per minute and the more nearly uniform pressure exerted by the piston which effects a forced feed of liquid through the tooth pockets in the rotors.

In both forms of my invention it will be clear that I have provided an arrangement in which, by proper determination of the number of escape passages, proper determination of the number of R. P. M. of the pulsating device, and proper proportioning of the parts and proper determination of the pressures, there may be effected pulsating movements of a wide variety of amplitudes and frequencies; that the structure is exceedingly simple, has no parts likely to become deranged in use, and is well designed for the production of the type of pulsating movement with different characteristics in the opposite parts of its cycles that is sought for shaker conveyors, shaker screens and similar mechanism.

While there are in this application specifically described two forms and a further modification which my invention may assume in practice, it will be understood that these are shown for purposes of illustration and that the invention may be modified and embodied in various other forms without departing from its spirit or the scope of the appended claims.

What I claim as new and desire to secure by Letters Patent is:

1. In an intermeshing gear pump, a pump casing, a pair of rotors arranged in said casing and having teeth intermeshing with each other, said teeth forming tooth pockets, an intake and a discharge at opposite sides of the mesh line of said rotors, a liquid source connected with said intake, means connected with said discharge and forming a resilient resistance against which said pump must discharge, the pressure per unit of area opposed to the discharge of said pump by said resilient resistance exceeding the pressure per unit of area of said liquid source, and means including a passage in at least one of said rotors for intermittently connecting said discharge with said intake and of a flow capacity sufficient, under the differential in pressure between said discharge and said intake, for the flow, during a period of connection, from said discharge to said intake of the full volume displaced by said pump in the interval between such intermittent connection and the preceding one.

2. In an intermeshing gear pump, a pump casing, a pair of rotors arranged in said casing and having teeth intermeshing with each other, said teeth forming tooth pockets, an intake and a discharge at opposite sides of the mesh line of said rotors, a liquid source connected with said intake, means connected with said discharge and forming a resilient resistance against which said pump must discharge, the pressure per unit of area opposed to the discharge of said pump by said resilient resistance exceeding the pressure per unit of area of said liquid source, and means formed in each of said rotors and periodically cooperating with each other for intermittently connecting said discharge with said intake and of a flow capacity sufficient, under the differential in pressure between said discharge and said intake, for the flow, during a period of connection, from said discharge to said intake of the full volume displaced by said pump in the interval between such intermittent connection and the preceding one.

3. In a hydraulic pulsating apparatus, rotary pumping means, means for continuously driving said pumping means in one direction, means for supplying hydraulic fluid to said pumping means, discharge means for the pumped fluid, said pumping means including a rotary pressure generating element and embodying means for intermittently positively displacing fluid under pressure into said discharge means and venting fluid therefrom, a reciprocatory cylinder and piston actuator, and means for connecting said discharge means to said actuator, said pumping means formed to displace to and vent from said reciprocatory cylinder and piston actuator, while it is respectively cut off by said pumping means from communication with said means for supplying hydraulic fluid to said actuator and connected by said pumping means with said means for supplying hydraulic fluid, equal quantities of hydraulic fluid during its respective displacing and venting periods.

4. In a hydraulic pulsator apparatus, a source of hydraulic fluid, rotary pumping means including a rotary pressure generating element, a reciprocatory hydraulic actuator including a member movable in one direction upon the supply of hydraulic fluid thereto at requisite pressure to effect a thrust against a yielding resistance and having associated with it means for providing such a yielding resistance and operative to move said member in the opposite direction upon the release of hydraulic fluid, and conduit means for conducting via said pumping means hydraulic fluid from said source to said actuator and from said actuator to said source in a closed system, said pumping means including passage means in said rotary pressure generating element for intermittently conducting hydraulic fluid from said actuator to said source and said pumping means operating alternately to discharge slugs of hydraulic fluid under pressure to said conduit means and to permit escape of such fluid, in volumes equal to such slugs, through said passage means to said source to effect operation of said reciprocatory actuator.

5. In a hydraulic pulsating apparatus, rotary pumping means including a rotary pressure generating element, means for continuously driving said pumping means in one direction, means for supplying hydraulic fluid to said pumping means, discharge means for the pumped fluid, said pumping means embodying means for intermittently positively displacing a volume of fluid under pressure from said hydraulic fluid supplying means into said discharge means while the latter is cut off by said pumping means from said hydraulic fluid supplying means and for venting an equal volume of fluid under pressure to said hydraulic fluid supplying means while the latter and said discharge means are interconnected through said pumping means, an actuator, means for connecting said discharge means to said actuator, said actuator including relatively reciprocable cylinder and piston elements, changes in the enclosed volume of which are equal to said equal volumes, said connecting means leading to one end of said cylinder element at one side of said piston element, and constantly acting yieldable means in said cylinder element at the opposite side of said piston.

6. In a pulsating apparatus, rotary pumping means including a rotary pressure generating element, means for continuously driving said pumping means in one direction, means for supplying hydraulic fluid to said pumping means, discharge means for the pumped fluid, said pumping means embodying means for intermittently positively displacing a volume of fluid under pressure from said hydraulic fluid supplying means into said discharge means while the latter is cut off by said pumping means from said hydraulic fluid supplying means and for venting an equal volume of fluid under pressure to said hydraulic fluid supplying means while the latter and said discharge means are interconnected through said pumping means, an actuator, means for connecting said discharge means to said actuator, said actuator including relatively reciprocable cylinder and piston elements, changes in the enclosed volume of which are equal to said equal volumes, said conducting means leading to one end of said cylinder element at one side of said piston element, and constantly acting yieldable means in said cylinder element at the opposite side of said piston element including a body of gaseous fluid confined in said cylinder element.

7. In an intermeshing gear pump, a casing, a pair of rotors arranged in said casing and having teeth intermeshing with each other, said teeth forming tooth pockets, an intake and a discharge at opposite sides of the mesh line of said rotors, means forming a hydraulic fluid reservoir in communication with said intake, means for maintaining a positive hydraulic head on said intake, and means for imposing a yielding resistance on said discharge, at least one of said rotors having formed therein means for periodically establishing interconnection between the discharge and the intake of said pump of a flow area, with the differential in head existing between said discharge and intake, adequate for the complete reverse flow, during each such interconnection, of the fluid transmitted from said intake to said discharge between successive interconnections.

8. In an intermeshing gear pump, a casing, a pair of rotors arranged in said casing and having teeth intermeshing with each other, said teeth forming tooth pockets, an intake and a discharge at opposite sides of the mesh line of said rotors, means forming a hydraulic fluid reservoir in communication with said intake, means for maintaining a positive hydraulic head on said intake, including an air chamber under superatmospheric pressure, and means for imposing a yielding resistance on said discharge, at least one of said rotors having formed therein means for periodically establishing interconnection between the discharge and the intake of said pump of a flow area, with the differential in head existing between said discharge and intake, adequate for the complete reverse flow, during each such interconnection, of the fluid transmitted from said intake to said discharge between successive interconnections.

9. In a hydraulic pulsator apparatus, a reciprocatory hydraulic actuator having an expansible chamber therein the volume of which undergoes a predetermined increase during the supply of fluid to such chamber to effect a working stroke of such actuator, a source of hydraulic fluid including means for maintaining under pressure a volume of fluid exceeding such predetermined increase in volume, pumping means including rotary pressure generating elements operative on predetermined rotation thereof to displace positively a volume of fluid equal to such predetermined increase in volume, means for connecting such rotary pressure generating elements for the supply of fluid thereto from said source and for the delivery of fluid therefrom to said expansible chamber, periodically operative means including passage means formed in at least one of said rotary pressure generating elements for releasing during each period of operation the fluid displaced by said elements to said reciprocatory hydraulic actuator during the interval between such period and the last previous one back to said source, and means constantly acting on said reciprocatory hydraulic actuator and exerting thereon a pressure adequate to displace fluid therefrom through said passage means to said source.

10. In an apparatus for imparting a jigging motion to a device to be actuated, cylinder and piston elements one having a stationary mounting and the other connected to a device to be moved, and fluid supply means including a fluid supply opening adjacent one end of said cylinder element and means associated with said fluid supply opening for permitting flow to the extreme end of said cylinder element but precluding reverse flow through it from said extreme end including an annular member surrounding said piston element in one of the extreme positions of the latter and having an annular chamber at its inner side and having radial ports communicating with the fluid supply for connecting said annular chamber with said fluid supply, and an annular valve sealing said ports against flow outwardly through the same.

References Cited in the file of this patent

UNITED STATES PATENTS

| Number | Name | Date |
|---|---|---|
| 772,842 | Spencer et al. | Oct. 18, 1904 |
| 941,409 | Ehrhart | Nov. 30, 1909 |
| 969,354 | Felumlee | Sept. 6, 1910 |
| 991,646 | Rich | May 9, 1911 |
| 1,115,605 | Snohr | Nov. 3, 1914 |
| 1,663,513 | Howse | Mar. 20, 1928 |
| 2,163,982 | Mercier | June 27, 1939 |
| 2,196,522 | Davis | Apr. 9, 1940 |
| 2,237,871 | Stone | Apr. 8, 1941 |
| 2,286,031 | Bowering | June 9, 1942 |
| 2,308,788 | Somes | Jan. 19, 1943 |
| 2,310,100 | Losey et al. | Feb. 2, 1943 |
| 2,346,761 | Johnson | Apr. 18, 1944 |
| 2,356,028 | Bullard | Aug. 15, 1944 |
| 2,391,973 | Hunter | Jan. 1, 1946 |
| 2,426,320 | Messinger | Aug. 26, 1947 |
| 2,452,176 | Bent | Oct. 26, 1948 |

FOREIGN PATENTS

| Number | Country | Date |
|---|---|---|
| 121,686 | Great Britain | Jan. 2, 1919 |
| 433,451 | Great Britain | Aug. 15, 1935 |
| 485,617 | Great Britain | May 16, 1938 |
| 67,702 | Sweden | July 16, 1929 |